United States Patent
Hazeyama et al.

(10) Patent No.: US 11,171,523 B2
(45) Date of Patent: Nov. 9, 2021

(54) ROTARY ELECTRIC MACHINE

(71) Applicant: Mitsubishi Electric Corporation, Tokyo (JP)

(72) Inventors: Moriyuki Hazeyama, Tokyo (JP); Junji Kitao, Tokyo (JP); Yoshihiro Miyama, Tokyo (JP); Shogo Okamoto, Tokyo (JP); Shinji Nishimura, Tokyo (JP); Ryuichi Kitora, Tokyo (JP); Ryuji Kitamura, Tokyo (JP); Hitoshi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 460 days.

(21) Appl. No.: 16/072,005

(22) PCT Filed: Nov. 29, 2016

(86) PCT No.: PCT/JP2016/085402
§ 371 (c)(1),
(2) Date: Jul. 23, 2018

(87) PCT Pub. No.: WO2017/154287
PCT Pub. Date: Sep. 14, 2017

(65) Prior Publication Data
US 2019/0036387 A1 Jan. 31, 2019

(30) Foreign Application Priority Data
Mar. 10, 2016 (JP) .............................. JP2016-046857

(51) Int. Cl.
*H02K 1/14* (2006.01)
*H02K 21/16* (2006.01)
(Continued)

(52) U.S. Cl.
CPC ................. *H02K 1/14* (2013.01); *H02K 1/22* (2013.01); *H02K 1/27* (2013.01); *H02K 1/2766* (2013.01); *H02K 21/16* (2013.01)

(58) Field of Classification Search
CPC .. H02K 1/14; H02K 1/22; H02K 1/27; H02K 1/2766; H02K 1/276; H02K 21/16
(Continued)

(56) References Cited

U.S. PATENT DOCUMENTS

2010/0119390 A1* 5/2010 Baba ..................... H02K 1/276
417/423.7
2011/0119390 A1* 5/2011 Leech ................ H04L 12/4679
709/228

FOREIGN PATENT DOCUMENTS

JP 2002-101628 A 4/2002
JP 2002-112472 A 4/2002
(Continued)

OTHER PUBLICATIONS

International Search Report of PCT/JP2016/085402 dated Feb. 28, 2017.

*Primary Examiner* — Terrance L Kenerly
(74) *Attorney, Agent, or Firm* — Sughrue Mion, PLLC; Richard C. Turner

(57) ABSTRACT

In a rotary electric machine, slots are formed between teeth of a stator core. A ratio of a number of poles to a number of slots is 2:3. When an electrical angle of a tooth tip width, which is a width dimension of a tip of each of the teeth in a circumferential direction of the stator, is represented by α, an electrical angle of a pole arc angle, which is an angle formed by two straight lines that connect a rotation center of a rotor to corners on a rotor surface side of one permanent magnet, is represented by β, and a number of pole pairs is represented by P, the tooth tip width is within a range of (Continued)

(electrical angle)±0.2°×P for a value that satisfies the following expression: $\beta=-2.5\alpha+319.7$ $(0<\beta\leq180)$ [deg].

10 Claims, 20 Drawing Sheets

(51) Int. Cl.
  *H02K 1/27* (2006.01)
  *H02K 1/22* (2006.01)
(58) Field of Classification Search
  USPC .................................. 310/156.56, 156.53
  See application file for complete search history.

(56) References Cited

FOREIGN PATENT DOCUMENTS

| JP | 2002-136003 A | | 5/2002 | |
|----|---------------|---|--------|---------|
| JP | 2008199894 | * | 8/2008 | ............... H02K 1/14 |
| WO | 2008/105049 A1 | | 9/2008 | |

\* cited by examiner

SHAFT LENGTH OF ROTOR CORE

SHAFT LENGTH OF ROTOR CORE

ROTARY ELECTRIC MACHINE

CROSS REFERENCE TO RELATED APPLICATIONS

This application is a National Stage of International Application No. PCT/JP2016/085402 filed Nov. 29, 2016, claiming priority based on Japanese Patent Application No. 2016-046857 filed Mar. 10, 2016.

TECHNICAL FIELD

The present invention relates to a concentrated winding rotary electric machine using permanent magnets.

BACKGROUND ART

A motor for an electrified vehicle, for example, a hybrid vehicle, is driven at RPM that is the same level as engine RPM (for example, 6,000 r/min) or higher RPM (10,000 r/min or more) and hence has a feature of wide operating range of RPM. As such a motor as being interposed between an engine and a transmission, a motor having a flat shape is preferred. Moreover, torque is generated by magnetic attraction force generated between a stator and a rotor. The magnetic attraction force varies depending on a position of the rotor, and hence when the varying magnetic attraction force matches a natural frequency of a circumferential portion of the stator of the motor, the motor generates noise.

Meanwhile, in a related-art permanent magnet rotary electric machine, a relationship between a tip width of each tooth of a stator and a pitch between magnets inserted in a rotor is numerically limited to reduce a distortion factor of a waveform of an induced voltage (see Patent Literature 1, for example).

Moreover, in another related-art concentrated winding motor, two or more kinds of teeth having different gap lengths to a rotor surface are provided in an axial direction of a stator to reduce noise near a carrier frequency (see Patent Literature 2, for example).

CITATION LIST

Patent Literature

[PTL 1] JP 2002-101628 A
[PTL 2] JP 2002-112472 A

SUMMARY OF INVENTION

Technical Problem

However, with the above-mentioned related-art rotary electric machines, vibrations caused by a variation in attraction force cannot be sufficiently suppressed, and it is desired to reduce the vibrations more efficiently.

The present invention has been made to solve the above-mentioned problem, and therefore has an object to provide a rotary electric machine, which is capable of suppressing vibrations caused by a variation in attraction force more efficiently.

Solution to Problem

According to one embodiment of the present invention, there is provided a rotary electric machine including: a stator including a stator core; and a rotor including a rotor core and a plurality of permanent magnets, which are fixed to the rotor core, the rotor being rotatable with respect to the stator, the stator core including an annular core back, and a plurality of teeth, which project radially inward from the annular core back, the stator core having slots formed between the plurality of teeth, the rotary electric machine having a ratio of a number of poles to a number of slots of 2:3, wherein, when an electrical angle of a tooth tip width, which is a width dimension of a tip of each of the plurality of teeth in a circumferential direction of the stator, is represented by α, an electrical angle of a pole arc angle, which is an angle formed by two straight lines that connect a rotation center of the rotor to corners on a rotor surface side of one of the plurality of permanent magnets, is represented by β, and a number of pole pairs is represented by P, the tooth tip width is within a range of (electrical angle)±0.2°×P for a value that satisfies the following expression: $β=-2.5α+319.7$ $(0<β≤180)$ [deg].

Further, according to one embodiment of the present invention, there is provided a rotary electric machine including; a stator including stator core; and a rotor including a rotor core and a plurality of permanent magnets, which are fixed to the rotor core, the rotor being rotatable with respect to the stator, the stator core including an annular core back, and a plurality of teeth, which project radially inward from the annular core back, the stator core having slots formed between the plurality of teeth, the rotary electric machine having a ratio of a number of poles to a number of slots of 2:3, wherein, when an electrical angle of a tooth tip width, which is a width dimension of a tip of each of the plurality of teeth in a circumferential direction of the stator, represented by α, an electrical angle of a pole arc angle, which is an angle formed by two straight lines that connect a rotation center of the rotor to corners on a rotor surface side of one of the plurality of permanent magnets, is represented by β, and α and β that satisfy the following expression: $β=-2.5α+319.7$ $(0<β≤180)$ [deg] are represented by α1, and β1, respectively, β is β1, and wherein each of the plurality of teeth is formed by combining, in an axial direction of the stator, a portion having a tooth tip width of γ1, which is smaller than α1 in electrical angle, and a portion having a tooth tip width of γ2, which is larger than α1 in electrical angle.

Still further, according to one embodiment of the present invention, there is provided a rotary electric machine including: a stator including a stator core; and a rotor including a rotor core, and a plurality of permanent magnets, which are fixed to the rotor core, the rotor being rotatable with respect to the stator, the stator core including an annular core back, and a plurality of teeth, which project radially inward from the annular core back, the stator core having slots formed between the plurality of teeth, the rotary electric machine having a ratio of a number of poles to a number of slots of 2:3, wherein, when an electrical angle of a tooth tip width, which is a width dimension of a tip of each of the plurality of teeth in a circumferential direction of the stator, is represented by α, an electrical angle of a pole arc angle, which is an angle formed by two straight lines that connect a rotation center of the rotor to corners on a rotor surface side of one of the plurality of permanent magnets, is represented by β, and α and β that satisfy the following expression: $β=-2.5α+319.7$ $(0<β≤180)$ [deg] are represented by α1 and β1, respectively, β is β1, wherein each of the plurality of teeth is formed by combining, in an axial direction of the stator, portions having a plurality of kinds of different tooth tip widths, and wherein at least one kind of tooth tip width has a minimum value in electrical angle that is smaller than α1, and at least one kind of tooth tip width has a maximum value in electrical angle that is larger than α1.

Advantageous Effects of Invention

According to the rotary electric machine of the present invention, a 6f component of an average value of attraction force of the teeth is reduced so that the vibrations caused by the variation in attraction force can be suppressed.

DESCRIPTION OF EMBODIMENTS

Next, embodiments of the present invention are described with reference to the drawings.

Embodiment 1

Figure 1:
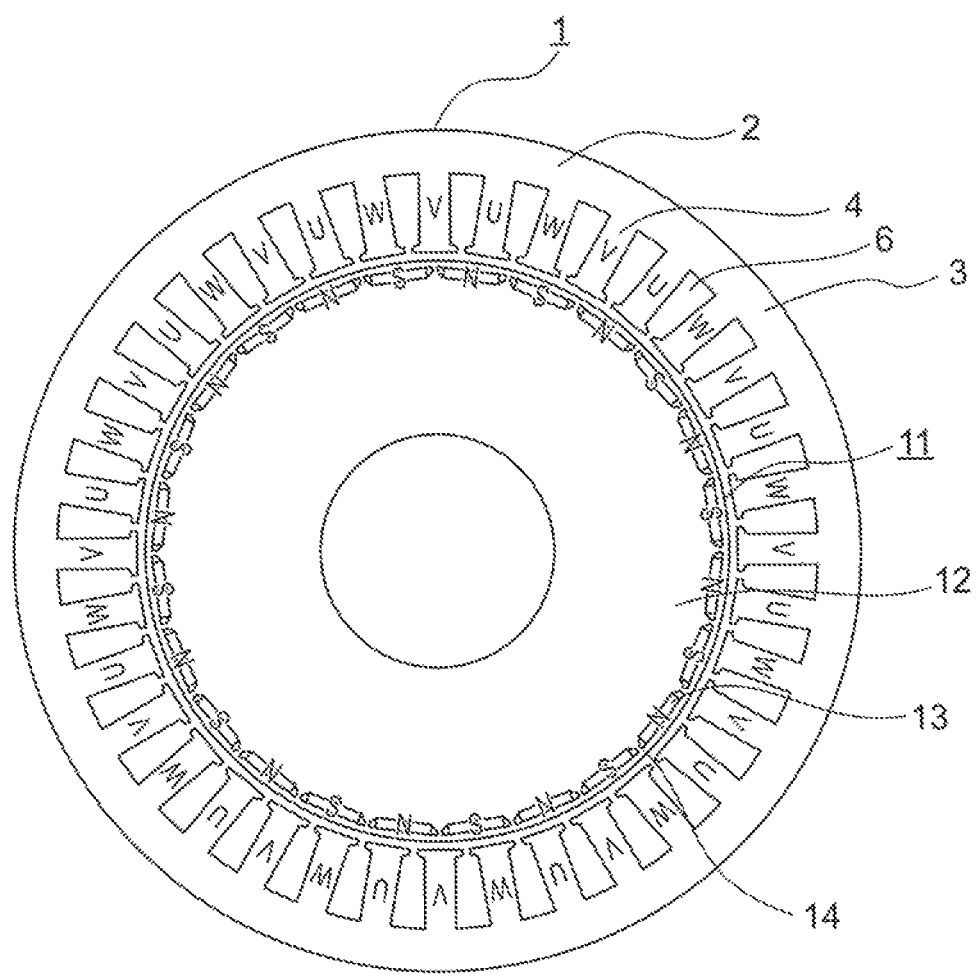
FIG. 1 is a cross-sectional view perpendicular to an axial direction of a rotary electric machine according to Embodiment 1 of the present invention.

FIG. 1 is a cross-sectional view perpendicular to an axial direction of a rotary electric machine according to Embodiment 1 of the present invention. In FIG. 1, the rotary electric machine includes a cylindrical stator 1, and a rotor 11, which is arranged inside the stator 1 to be rotatable with respect to the stator 1. The stator 1 includes a cylindrical stator core 2, and a plurality of windings (not shown), which are placed in the stator core 2.

The stator core 2 includes an annular core back 3, and a plurality of (in this example, 36) teeth 4, which project radially inward from the core back 3. The teeth 4 are arranged at an equal pitch in a circumferential direction of the stator 1. A slot 6 is formed between adjacent teeth 4. In other words, the number of slots of the stator core 2 is 36. Each winding is wound around the teeth 4 and inserted in the slots 6.

Phases of the windings are ordered as a U-phase, a V-phase, and a W-phase counterclockwise in FIG. 1. When torque is applied to a motor, a three-phase AC current having a phase difference of 120 degrees is caused to pass through each phase.

The rotor 11 includes a cylindrical rotor core 12, and a plurality of (in this example, 24) permanent magnets 13, which are embedded and fixed in an outer periphery of the rotor core 12. An outer peripheral surface of the rotor core 12 is opposed to an inner peripheral surface of the stator core 2, that is, a tip surface of each tooth 4 via a gap.

The permanent magnets 13 are arranged at an equal pitch in a circumferential direction of the rotor 11. As each permanent magnet 13, a rectangular solid neodymium magnet is used, and one pole is formed of one permanent magnet 13. The reference symbols "N" and "S", which are illustrated in FIG. 1, indicate poles of the permanent magnets 13. A direction of N-magnetic fluxes is a direction toward the outer periphery of the rotor 11, and a direction of S-magnetic fluxes is a direction from the outer periphery to an inner periphery of the rotor 11. In the outer periphery of the rotor 11, magnetic poles having different polarities are alternately formed in the circumferential direction.

Moreover, at both ends of each permanent magnet 13 in the circumferential direction of the rotor 11, flux barriers 14 configured to suppress leakage of magnetic fluxes of the permanent magnets 13 are provided. The rotary electric machine according to Embodiment 1 is a concentrated winding motor having a ratio of the number of poles to the number of slots of 2:3.

Figure 2:
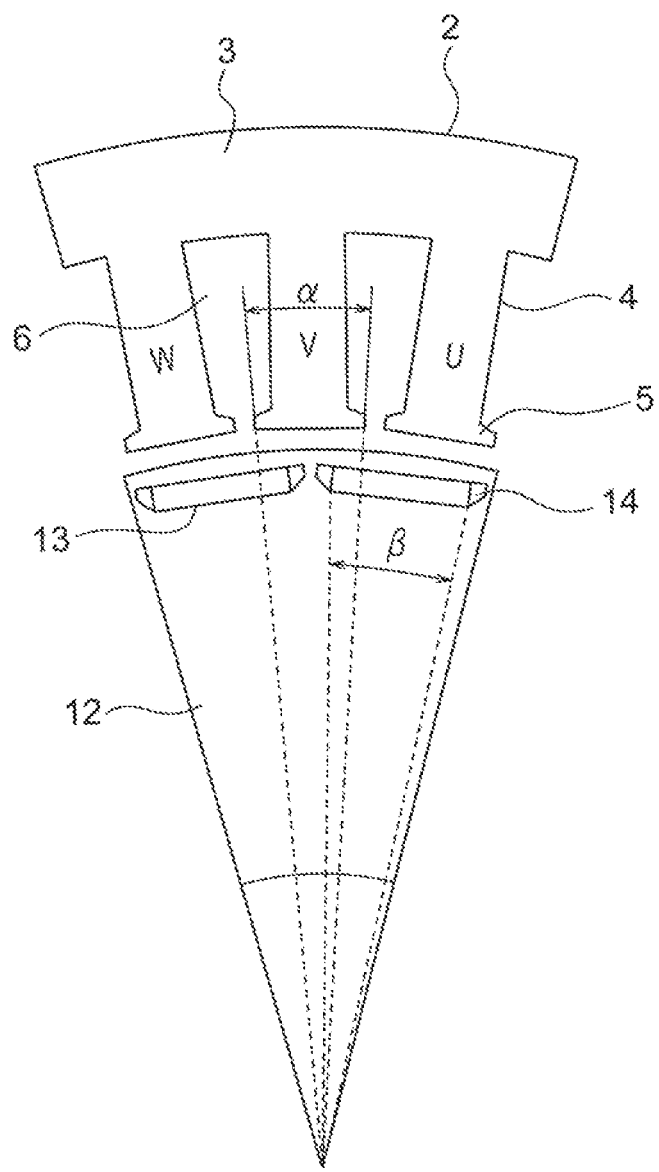
FIG. 2 is a cross-sectional view for illustrating an enlarged part of the rotary electric machine of FIG. 1.

FIG. 2 is a cross-sectional view for illustrating an enlarged part of the rotary electric machine of FIG. 1, and the stator 1 and the rotor 11 for one pole pair are illustrated. At a distal end of each tooth 4, that is, at an end of each tooth 4 on a radially inner side of the stator 1, a tooth flange 5 is provided. A width dimension of each tooth 4 (dimension of each tooth 4 in the circumferential direction of the stator 1) in the tooth flange 5 is larger than a width dimension of a portion of each tooth 4 on the core back 3 side of the tooth flange 5.

At this time, an electrical angle of the width dimension of a tip of each tooth 4 including the tooth flange 5, that is, a tooth tip width, is represented by $\alpha$. The electrical angle $\alpha$ is calculated, in a cross section perpendicular to an axis of the rotary electric machine, as an angle formed by two straight lines that connect a rotation center of the rotor 11 to both ends in a width direction of one tooth 4 in a direction of rotation of the rotor 11.

The electrical angle is a value obtained by multiplying a mechanical angle by the number of pole pairs. In Embodiment 1, with the number of poles being 24 poles and the number of pole pairs being 12, a value obtained by multiplying the angle between the two straight lines in the direction of rotation, which is the mechanical angle, by 12 is $\alpha$.

Similarly, an electrical angle of a pole arc angle of each permanent magnet 13 excluding the flux barriers 14 is represented by $\beta$. The electrical angle $\beta$ is calculated, in the cross section perpendicular to the axis of the rotary electric machine, as an angle formed by two straight lines that connect the rotation center of the rotor 11 to corners on a rotor surface side (both ends in the circumferential direction of the rotor 11) of one permanent magnet 13 (one pole) in the direction of rotation of the rotor 11. Therefore, as with the calculation of the electrical angle $\alpha$, a value obtained by multiplying the angle between the two straight lines in the direction of rotation, which is a mechanical angle, by 12 is $\beta$.

Next, noise generating factors in the concentrated winding motor having the ratio of the number of poles to the number of slots of 2:3, which is described in Embodiment 1, are described first for a case in which an electric current is not caused to pass through the windings.

When the rotor 11 is seen from each tooth 4, attraction force is changed when an N-pole is brought near and away from the tooth, and the same is true for an S-pole. Therefore, when seen for teeth 4 of each phase, the attraction force varies twice for each rotation by 360° of the electrical angle.

When the attraction force is seen for three teeth 4, timings at which the N-pole and the S-pole are brought near or away from the teeth are different for each rotational position, and hence the attraction force varies six times for each rotation by 360° of the electrical angle.

The description has been given for the case in which the electric current is not caused to pass through the windings. Similarly in a case where the electric current is caused to pass through the windings, a rotating magnetic field of the N-pole and the S-pole is merely generated by each tooth 4 in the direction of rotation of the rotor 11, and hence the attraction force of the teeth 4 mainly varies six times for three teeth 4.

Figure 3:
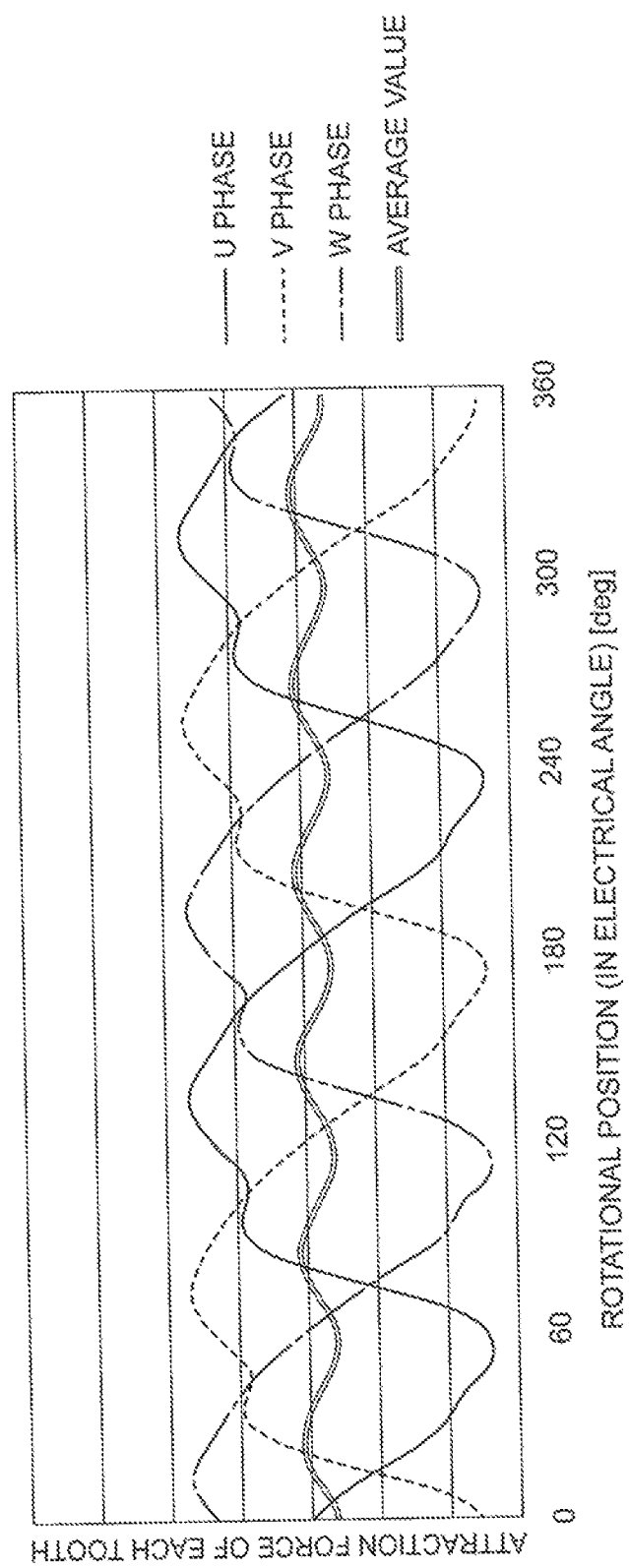
FIG. 3 is a graph for showing dependencies of attraction force of teeth of respective phases and an average value of attraction force of three phases on a rotational position in Embodiment 1.

Dependencies of the attraction force of the teeth 4 of respective phases on the electrical angle at a time when the electric current is caused to pass are shown in FIG. 3. In FIG. 3, a case in which a tip width of each tooth 4 is 77.0° in electrical angle, and in which the pole arc angle of each permanent magnet 13 is 128.1° in electrical angle is shown.

As shown in FIG. 3, it can be seen that the attraction force is changed for a phase difference of 120° among the U-phase, the V-phase, and the W-phase. Moreover, as for an average value of the attraction force of the phases, it can be seen that the average value varies six times for each cycle of the electrical angle.

The average value of the attraction force of the phases refers to average attraction force with respect to the rotating magnetic field. It is shown that, when the attraction force of the phases is sinusoidal, the average value of the attraction force is constant, that is, has no varying component. Therefore, when the average value of the attraction force varies, the core back 3 and the teeth 4 vibrate.

Meanwhile, the stator core 2 is fixed to a frame or the like (not shown), and has a natural frequency depending on a deformation mode of the stator. The deformation mode refers to easiness of deformation at a time when force is applied in a plurality of directions for one cycle of mechanical angle. For example, a deformation mode 2 indicates easiness of deformation into an elliptical shape. At this time, when the natural frequency of the frame or the like matches a time frequency of the rotating magnetic field of the deformation mode 2, the frame resonates to generate noise. Therefore, it is required to take noise reduction measures depending on each deformation mode.

As described above, in the 24-pole, 36-slot motor, which is described in Embodiment 1, the average value of the attraction force varies six times for two poles and three slots. The deformation mode at this time is 0. The deformation mode 0 is a mode of a complete round shape in which the force is increased or reduced uniformly irrespective of the rotational position, and when the attraction force has no varying component, the mode does not match the natural frequency.

However, in a case where the varying component of the attraction force pulsates as shown in FIG. 3, when the natural frequency of the frame or the like of the deformation mode 0 matches the frequency of the varying component of the attraction force, the frame or the like resonates to generate noise. The natural frequency of the deformation mode 0 is known to be dependent on an outer diameter of the motor, and when the outer diameter is increased, the natural frequency is reduced.

Figure 4:
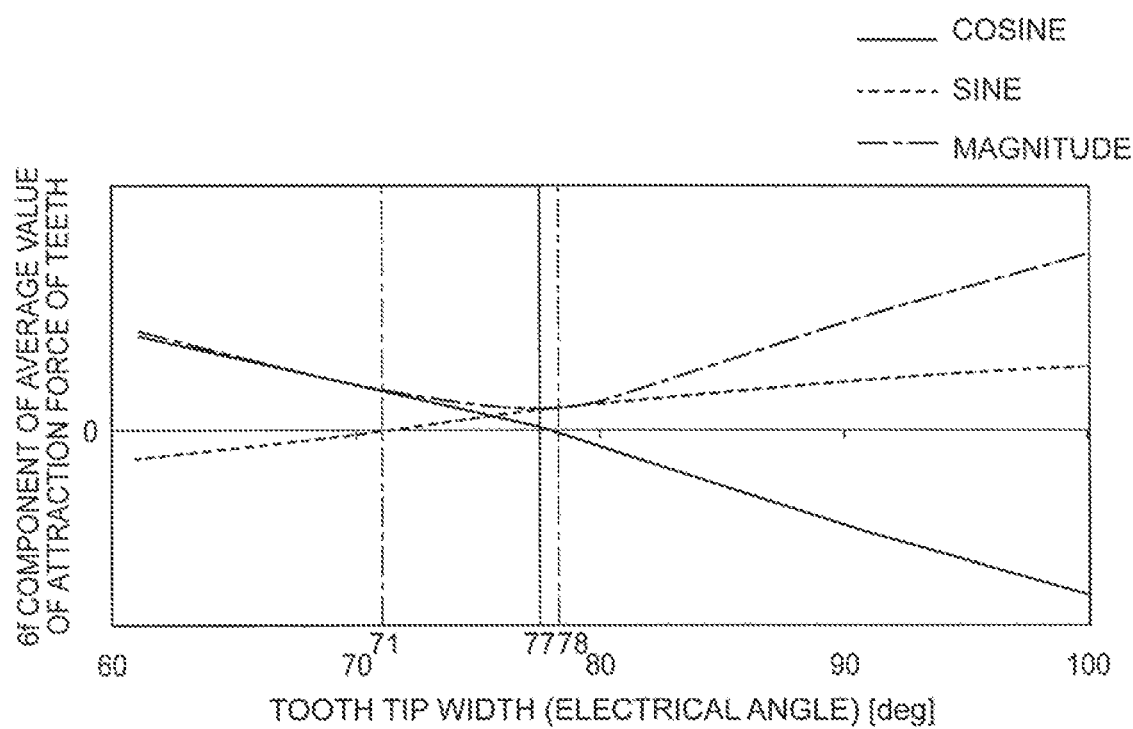
FIG. 4 is a graph for showing a dependency of a varying component of the attraction force on a tooth tip width when a pole arc angle of permanent magnets is 128.1° in Embodiment 1.

Next, in a case where the pole arc width β of each permanent magnet 13 is 128.1° in electrical angle, the tip width α of each tooth 4 and an amplitude of the varying component of the average value of the attraction force of all teeth 4 are shown in FIG. 4. Here, the average value of the attraction force of all teeth 4, which is shown in FIG. 3, can be expressed as Expression 1 below.

$$F = C + \Sigma_{i=1}^{n}(A_n \cos n\theta + B_n \sin n\theta)$$  Expression 1

In Expression 1, F represents an average value of attraction force of all teeth 4, C represents a DC component of the average value of the attraction force of all teeth 4, $A_n$ represents cosine of an n-th order component of the average value of the attraction force of all teeth 4, and $B_n$ represents sine of the n-th order component of the average value of the attraction force of all teeth 4.

As shown in FIG. 3, with the varying component of the attraction force varying six times for each cycle of the electrical angle, the varying component of the average value of the attraction force is hereinafter described as a 6th order component (6f component). The letter "f" represents an electrical angle fundamental frequency, and is 1,000/60* (number of pole pairs (12))=200 Hz for 1,000 r/min, for example.

Figure 5:
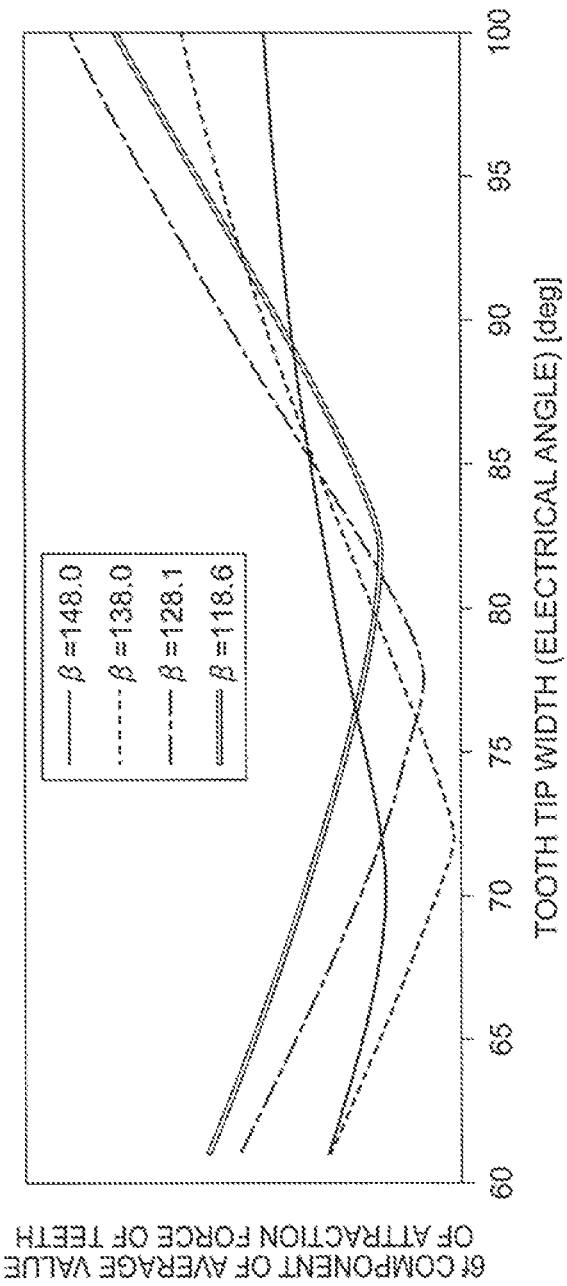
FIG. 5 is a graph for showing a dependency of the varying component of the attraction force on the tooth tip width at each pole arc angle of the permanent magnets in Embodiment 1.

FIG. 4 is a graph in which, after the varying component of the average value of the attraction force of the teeth is separated into sine and cosine by Fourier transform, sine, cosine, and a magnitude of the 6f component are plotted for each tooth tip width. As shown in FIG. 4, a tooth tip width with which the 6f component of the average value of the attraction force of the teeth is smallest is 77° in electrical angle. Moreover, tooth tip widths with which cosine and sine of the 6f component of the average value of the attraction force of the teeth is 0 are 78° and 71°, respectively, in electrical angle, Further, in a method similar to that for FIG. 4, a relationship between the tooth tip width and the 6f component of the average value of the attraction force of the teeth 4 for different pole arc angles β of each permanent magnet 13 is shown in FIG. 5. As shown in FIG. 5, it can be seen that, when the pole arc angle β of each permanent magnet 13 is changed, an optimal value of the tooth tip width with which the 6f component of the average value of the attraction force of the teeth 4 is minimized is changed. A result obtained by plotting optimal tooth tip widths with which the magnitude of the 6f component of the average value of the attraction force of the teeth 4 is minimized, which are determined from FIG. 5, is shown in FIG. 6.

Figure 6:
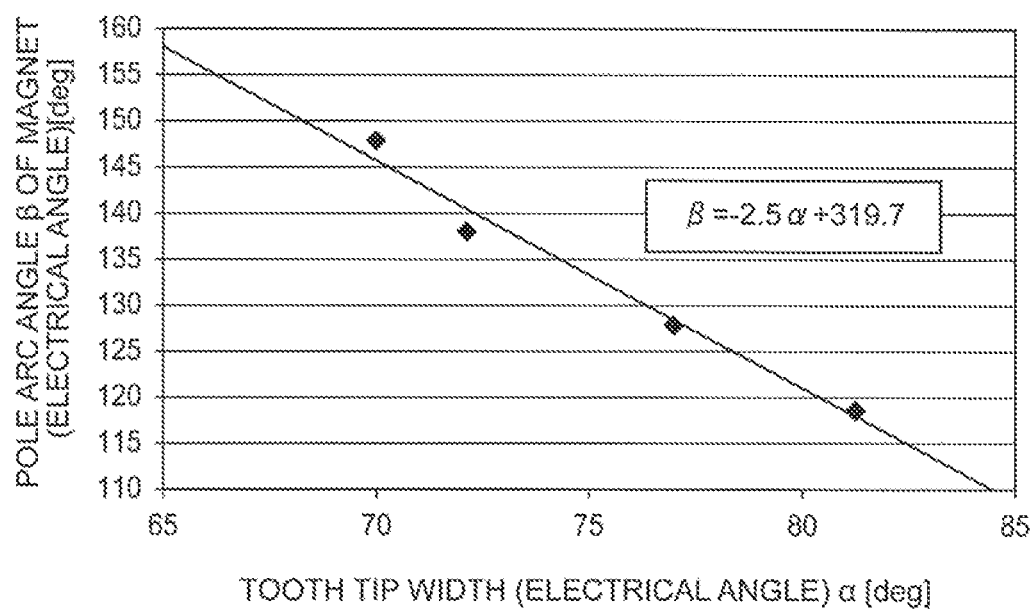
FIG. 6 is a graph for showing a relationship of a tooth tip width with which the varying component of the attraction force is minimized at each pole arc angle of the permanent magnets in Embodiment 1.

As shown in FIG. 6, a relationship between the pole arc angle β of each permanent magnet 13 with which the magnitude of the 6f component of the average value of the attraction force of the teeth 4 is minimized and the tooth tip width α can be expressed as β=−2.5α+319.7 [deg], and it can be seen that the pole arc angle β and the tooth tip width α are substantially linearly proportional to each other.

Therefore, when the pole arc width β of each permanent magnet 13 is determined, the tooth tip width with which the 6f component of the average value of the attraction force of the teeth 4 is minimized can be uniquely determined, and the noise of the motor can be reduced.

Figure 7:
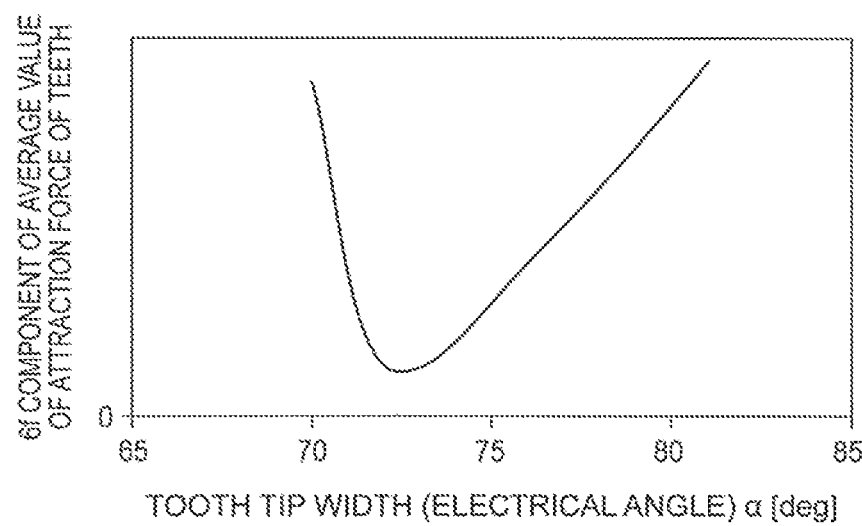
FIG. 7 is a graph for showing a relationship between a 6f component of the average value of the attraction force of the teeth and the tooth tip width when a relational expression of FIG. 6 is satisfied.

Moreover, a relationship between the tip width of each tooth 4 and the 6f component of the average value of the attraction force of the teeth 4 at a time when the pole arc angle β of each permanent magnet 13 and the tip width α of each tooth 4 satisfy β=−2.5α+319.7 [deg] is shown in FIG. 7. As shown in FIG. 7, the tooth tip width is minimized at around an electrical angle of 72°, and the pole arc angle β of each permanent magnet 13 at that time is 139.7° in electrical angle.

Through reduction of the 6f component of the average value of the attraction force of the teeth 4 described above, vibrations caused by the variation in attraction force of the motor can be suppressed, and hence the noise of the motor can be reduced efficiently.

In FIG. 6, the relationship between the pole arc angle β of each permanent magnet 13 and the tooth tip width α is shown. However, it is required to take manufacturing tolerance into account, and the tooth tip width is within a range of (electrical angle)±0.2°×P (number of pole pairs) for a value that satisfies β=−2.5α+319.7 [deg].

Moreover, in Embodiment 1, the case of 24 poles and 36 slots has been described. However, in addition to 24 poles and 36 slots, similar effects can be obtained as long as the ratio of the number of poles to the number of slots is 2:3.

Figure 8:
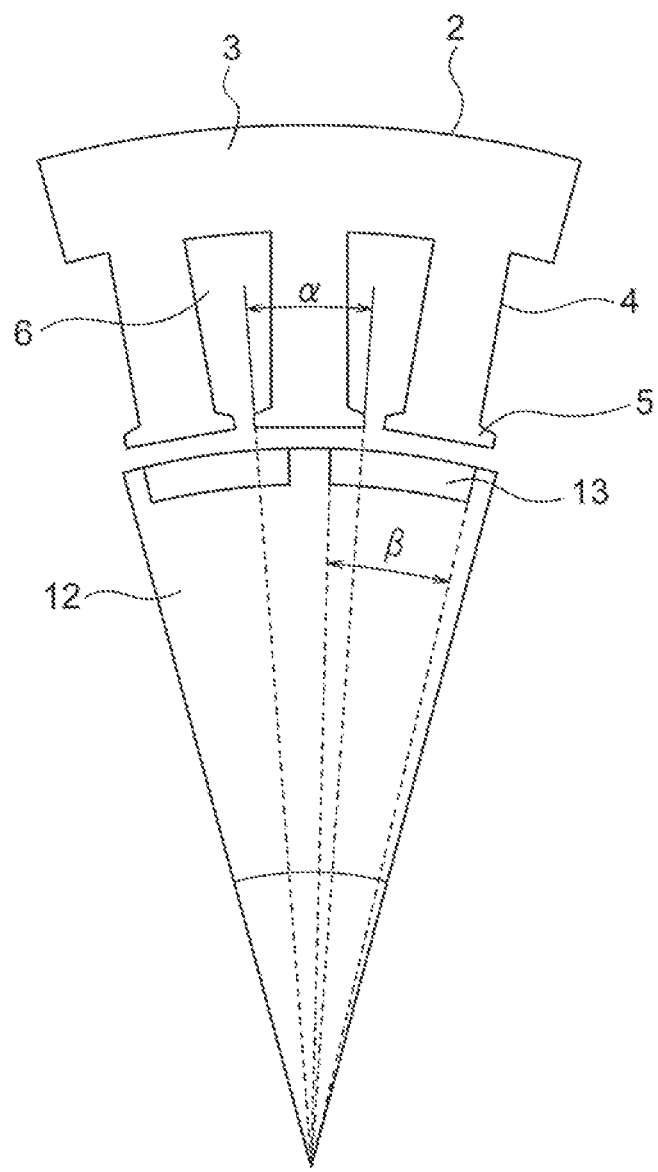
FIG. 8 is a cross-sectional view for illustrating a modification example in which the permanent magnets of FIG. 2 are exposed to an outer periphery of a rotor core.

Further, in Embodiment 1, the motor in which the permanent magnets 13 are embedded in the rotor core 12 has been described. However, similar effects can be obtained also with a surface magnet rotor in which the permanent magnets 13 are exposed to the outer periphery of the rotor core 12 as illustrated in FIG. 8.

Embodiment 2

Next, Embodiment 2 of the present invention is described. The basic structure of a rotary electric machine according to Embodiment 2 is similar to that of FIG. 1. In Embodiment 2, when α and β that satisfy the following expression: β=−2.5α+319.7 (0<β≤180) [deg] are represented by α1 and respectively, β is β1, and each tooth 4 is formed by combining, in an axial direction of the stator 1, a portion having a tooth tip width of γ1, which is smaller than α1 in electrical angle, and a portion having a tooth tip width of γ2, which is larger than α1 in electrical angle.

Moreover, when an average value of radial attraction force generated by all teeth 4 is represented by F1, the least common multiple of the number of poles and the number of slots is represented by S1, and when varying components of an (S1/P)-th order of the radial attraction force are separated into cosine and sine for each of the tooth tip widths γ1 and γ2, tooth tip widths with which absolute values of cosine and sine are minimized are represented by δ1 and δ2, respectively, an electrical angle of the tooth tip widths δ1 and δ2 that is smaller than the pole arc angle of each permanent magnet 13 is represented by Amin, and an electrical angle of the tooth tip widths δ1 and δ2 that is larger than the pole arc angle is represented by Amax, (tooth tip width γ1)<Amin, and Amax<(tooth tip width γ2).

Further, when magnitudes of change amounts of the (S1/P)-th order of radial attraction force of cosine or sine of the varying components of the (S1/P)-th order of the radial attraction force generated by all teeth 4 that is larger in change amount when the tooth tip width is varied are represented by Fγ1 and −Fγ2, the portion of γ1 and the portion of γ2 are stacked such that thicknesses of the portion of γ1 and the portion of γ2 in a shaft length direction have a ratio of |Fγ2|:|Fγ1|.

Figure 9:
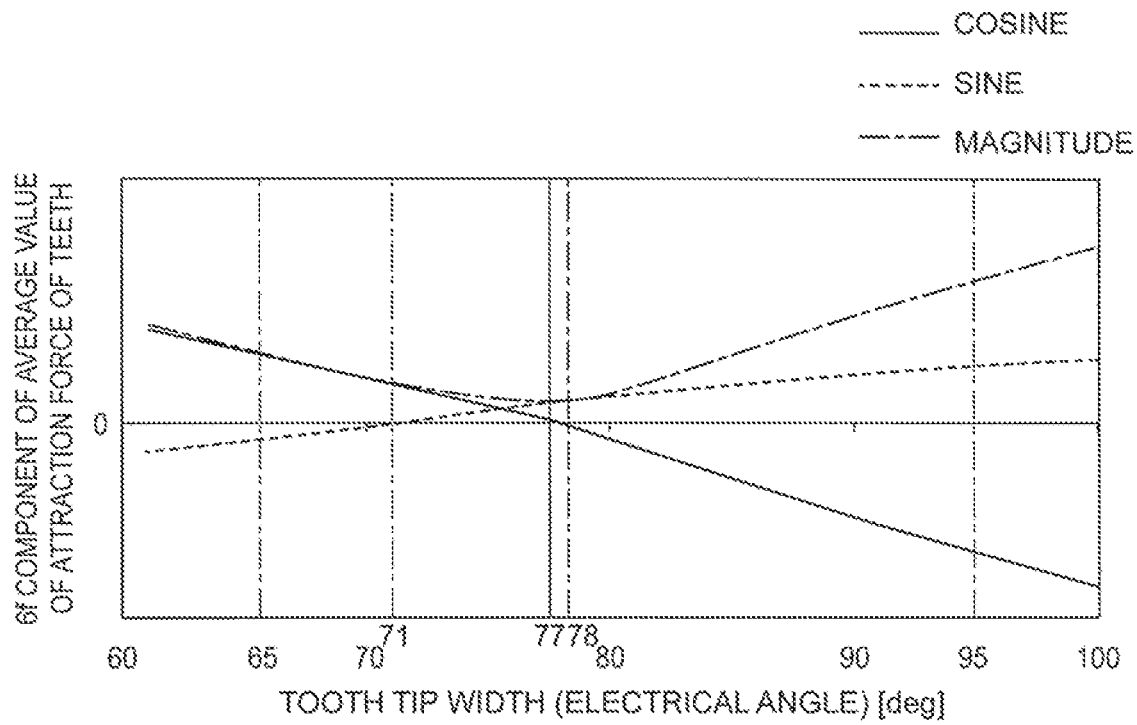
FIG. 9 is a graph for showing a relationship between a tooth tip width and a 6f component of an average value of attraction force of teeth when a pole arc angle of each permanent magnet of a rotary electric machine according to Embodiment 2 of the present invention is 128.1°.

FIG. 9 is a graph for showing a relationship between the tooth tip width and the 6f component of the average value of the attraction force of the teeth 4 when the pole arc angle β of each permanent magnet 13 of the rotary electric machine according to Embodiment 2 is 128.1°, and is obtained by additionally depicting values of the electrical angles 65° (γ1) and 95° (γ2) in FIG. 4.

In Embodiment 2, different tooth tip widths are combined in the axial direction to reduce the 6f component of the average value of the attraction force of the teeth 4. When the 6f component of the average value of the attraction force of the teeth 4 is seen in FIG. 9, there is an angle with which cosine or sine is 0. As described also in Embodiment 1, when an electrical angle with which cosine is 0 is defined as δ1, and an electrical angle with which sine is 0 is defined as δ2, those values are δ1=78° and δ2=71°.

Those values are changed depending on the pole arc angle β of each magnet. Moreover, when a smaller one of δ1 and δ2 is defined as Amin, and a larger one of δ1 and δ2 is defined as Amax, Amin=71° and Amax=78° in this example.

For example, in a case where the pole arc angle of each magnet is 128.1° in electrical angle (shown in FIG. 9), a consideration is made of combining an electrical angle of 65° with which the tooth tip width is smaller than Amin and an electrical angle of 95° with which the tooth tip width is larger than Amax. When the tooth tip width is smaller than Amin, as shown in FIG. 9, cosine of the 6f component of the average value of the attraction force of the teeth 4 is in a positive region, and sine is in a negative region. Meanwhile, when the tooth tip width is larger than Amax, cosine of the 6 f component of the average value of the attraction force of the teeth is in the negative region, and sine is in the positive region. Therefore, when both are combined in the axial direction, cosine and sine of the 6f component of the average value of the attraction force of the teeth 4 are canceled by each other.

Figure 10:
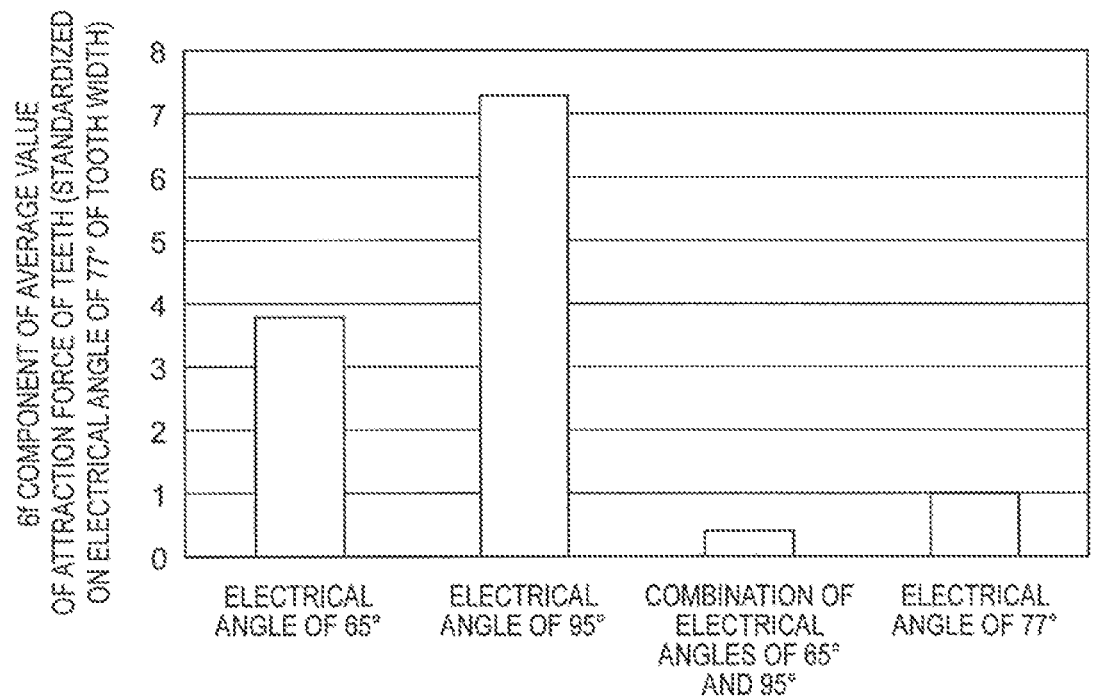
FIG. 10 is a graph for showing differences among magnitudes of 6f components of average values of the attraction force of the teeth depending on differences in tooth tip width.

In FIG. 10, with the pole arc angle of each magnet being 128.1° in electrical angle, respective magnitudes of 6f components of average values of the attraction force of the teeth 4 for a case in which the tooth tip width is 65° in electrical angle, a case in which the tooth tip width is 95° in electrical angle, a case in which the tooth tip widths of 65° and 95° in electrical angle are combined, and a case in which the tooth tip width is 77° in electrical angle are shown.

The vertical axis indicates the 6f components of the average values of the attraction force of the teeth 4 that are standardized on the value of 77° in electrical angle. For the case in which the electrical angle of 65° and the electrical angle of 95° are combined, a case in which a ratio of lengths of the teeth 4 in the axial direction of the stator 1 is 2:1 for the electrical angle 65° and the electrical angle 95°.

As shown in FIG. 10, the 6f components for the case in which the tooth tip width is 65° in electrical angle and the case in which the tooth tip width is 95° in electrical angle are as large as 3.9 and 7.3 times the 6f component for the case of an optimal tooth tip width of 77°, respectively. In contrast, the 6f components for the case in which the electrical angle of 65° and the electrical angle of 95° are combined in a stacking ratio of 2:1 is half the 6f component for the case in which the tooth tip width is 77° or less.

From the above description, through combining the portion in which the tooth tip width is smaller than Amin in electrical angle and the portion in which the tooth tip width is larger than Amax in electrical angle, the 6f components of the average values of the attraction force of the teeth 4 as a whole can be canceled by each other, and the noise of the motor can be reduced efficiently.

In Embodiment 2, the values with which cosine and sine of the 6f component of the average value of the attraction force of the teeth 4 are 0 are calculated to reduce the noise of the motor more effectively. However, also when the tooth tip width γ1 that is smaller than the tooth tip width α and the tooth tip width γ2 that is larger than the tooth tip width α, which are shown in the relationship between the pole arc angle β of each permanent magnet 13 and the tooth tip width α, which is shown in FIG. 6, are combined, because of the different phases of the 6f components of the average values of the attraction force of the teeth, the 6f component of the average value of the attraction force of the teeth 4 can be reduced.

Moreover, in Embodiment 2, as a method of combining the tooth tip widths of different electrical angles, the tooth tip widths have been combined such that the 6f component of the average value of the attraction force of the teeth 4 is minimized. However, of cosine and sine shown in FIG. 9, tooth tip widths having change amounts of the 6f component of the average value of the attraction force of the teeth 4 that are larger than the tooth tip width may be combined. In the case of FIG. 9, cosine of the 6f component of the average value of the attraction force of the teeth 4 is larger than sine in change amount, and hence when combined with a ratio of cosine, the tooth tip widths can be combined more effectively and easily.

Figure 11:
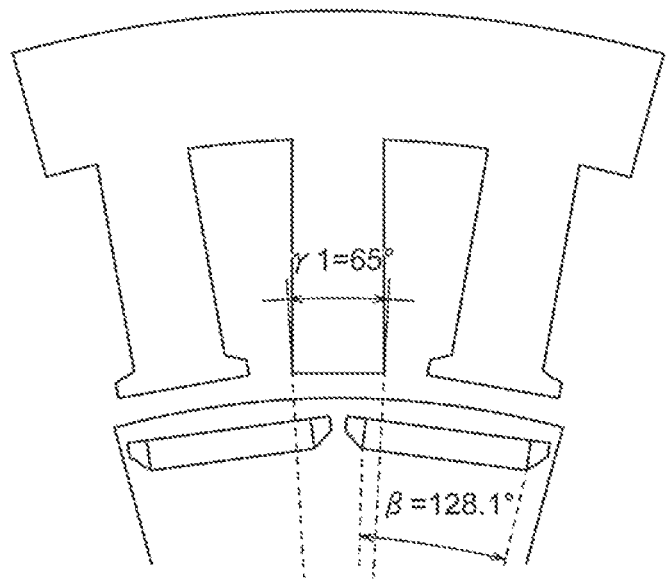
FIG. 11 is a shape view in which a tooth tip width in electrical angle is 65° when the pole arc angle of each magnet is 128.1°.
Figure 12:
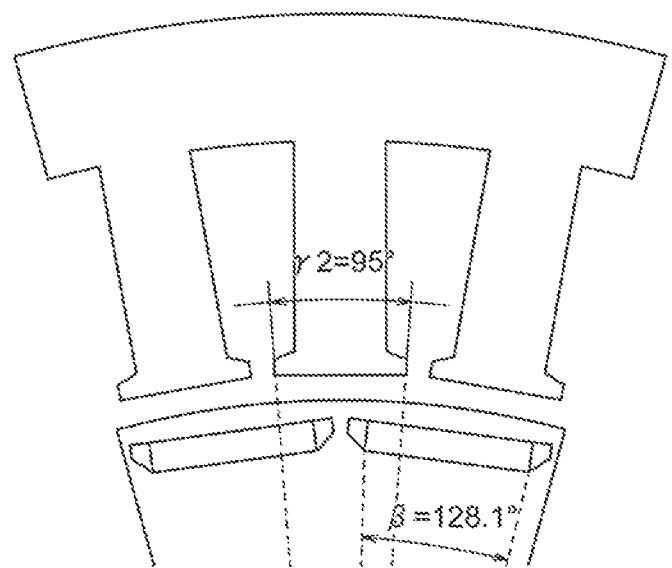
FIG. 12 is a shape view in which a tooth tip width in electrical angle is 95° when the pole arc angle of each magnet is 128.1°.

Now, FIG. 11 and FIG. 12 are shape views in a case where the tooth tip width is 65° (γ1) in electrical angle and a case where the tooth tip width is 95° (γ2) in electrical angle. For example, in a case where cosine values of the 6f components of the average values of the attraction force of the teeth for the tooth tip width γ1 and the tooth tip width γ2 have magnitudes of 1:2 and phases that are 180° opposite, when the tooth tip width γ1 and the tooth tip width γ2 are combined in the shaft length direction with a ratio of shaft lengths of 2:1, the 6f component of the average value of the attraction force of the teeth 4 is reduced.

Figure 13:
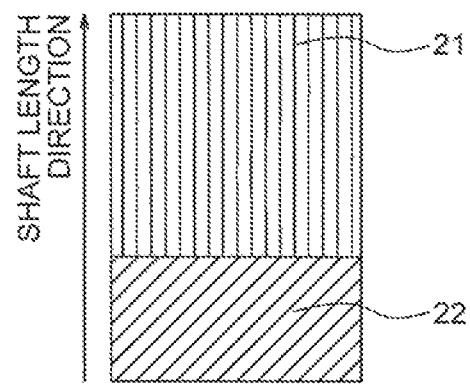
FIG. 13 is an explanatory view for illustrating a first example of a method of combining different tooth tip widths.
Figure 14:
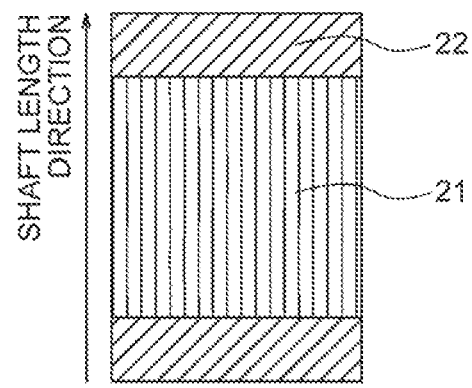
FIG. 14 is an explanatory view for illustrating a second example of the method of combining different tooth tip widths.
Figure 15:
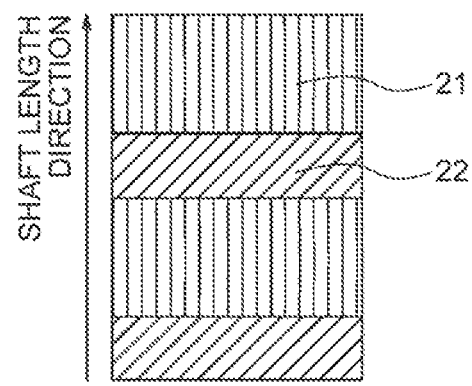
FIG. 15 is an explanatory view for illustrating a third example of the method of combining different tooth tip widths.

As the method of combining in this case, a portion 21 of the tooth tip width γ1 and a portion 22 of the tooth tip width γ2 may be divided at one point in the shaft length direction as illustrated in FIG. 13, or may be divided at two or more points as illustrated in FIG. 14 or FIG. 15. In other words, any ratio of shaft lengths at which the 6f component of the average value of the attraction force of the teeth 4 is minimized may be set when considered as an entire shaft length.

In Embodiment 2, the optimal skew angle of 72 degrees or more has been considered. However, dimensional tolerance is generated during manufacture, and hence a difference of ±0.2 degree in mechanical angle (2.4 degrees in electrical angle) may occur in an actual shape of the machine.

Moreover, the change amounts Fγ1 and Fγ2 of the (S1/P)-th order of the radial attraction force correspond to a positive value and a negative value, respectively.

Embodiment 3

Next, Embodiment 3 of the present invention is described. The basic structure of a rotary electric machine according to Embodiment 3 is similar to that of FIG. 1.

Figure 16:
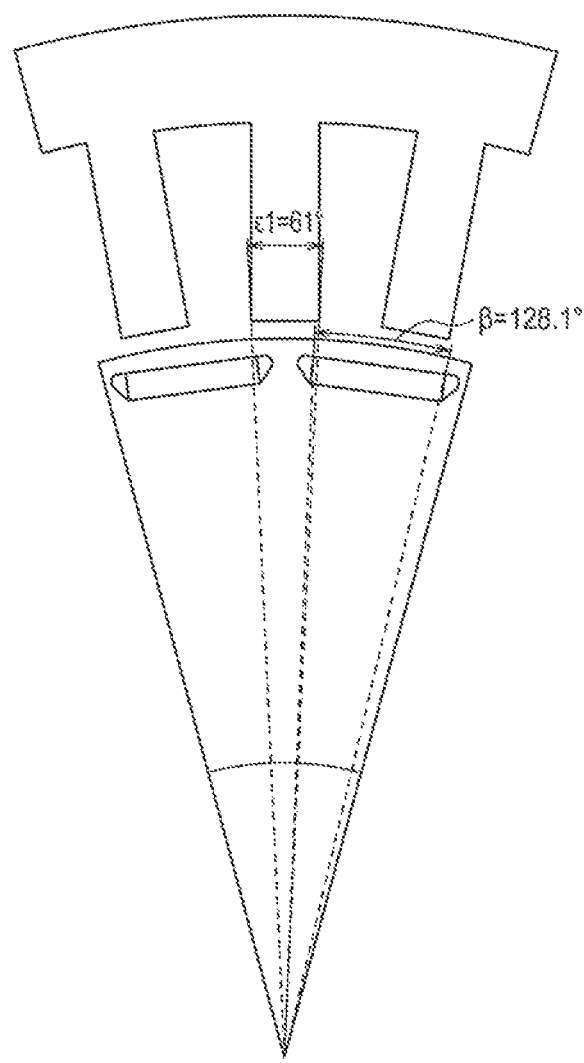
FIG. 16 is a shape view in which a tooth tip width in electrical angle is 61° when the pole arc angle of each magnet is 128.1°.
Figure 17:
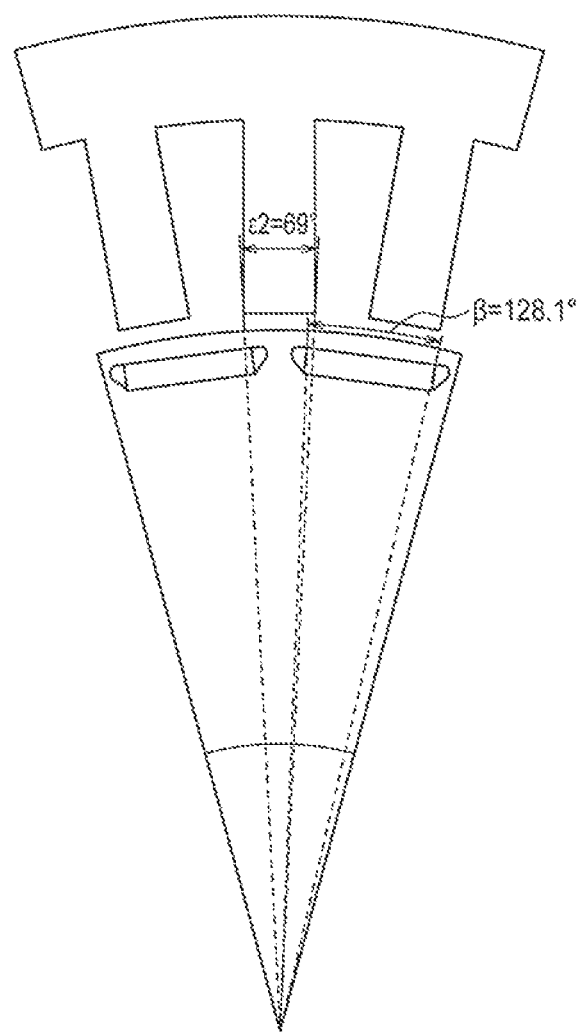
FIG. 17 is a shape view in which a tooth tip width in electrical angle is 69° when the pole arc angle of each magnet is 128.1°.
Figure 18:
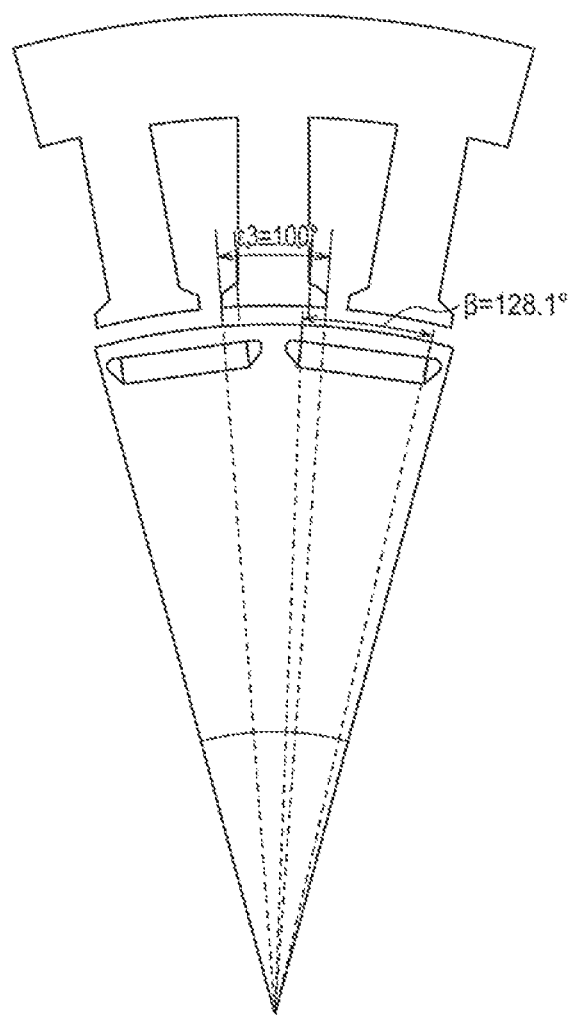
FIG. 18 is a shape view in which a tooth tip width in electrical angle is 100° when the pole arc angle of each magnet is 128.1°.

FIG. 16 is a shape view in which a tooth tip width in electrical angle of 61° (ε1) when the pole arc angle of each magnet is 128.1°, FIG. 17 is a shape view in which a tooth tip width in electrical angle of 69° (ε2) when the pole arc angle of each magnet is 128.1°, and FIG. 18 is a shape view in which a tooth tip width in electrical angle of 100° when the pole arc angle of each magnet is 128.1° (ε3).

In Embodiment 3, there is adopted a configuration in which three kinds of tooth tip widths: ε1, ε2, and ε3 are used, and portions of the respective tooth tip widths are combined in the axial direction of the stator 1. The tooth tip widths have the following size relationship: ε1<ε2<ε3.

Now, an average value of radial attraction force generated by all teeth 4 is represented by H. Moreover, the least common multiple of the number of poles and the number of slots is represented by S1. Further, when varying components of the (S1/P)-th order of the radial attraction force are separated into cosine and sine for each tooth tip width, tooth tip widths with which absolute values of cosine and sine are minimized are represented δ1 and δ2, respectively. Still further, an electrical angle of the tooth tip widths δ1 and δ2 that is smaller than the pole arc angle of each permanent magnet 13 is represented by Amin, and an electrical angle of the tooth tip widths δ1 and δ2 that is larger than the pole arc angle is represented by Amax. At this time, the tooth tip widths satisfy the relationships: ε1<Amin and Amax<2498 3 for the pole arc angle of each permanent magnet 13.

Figure 19:
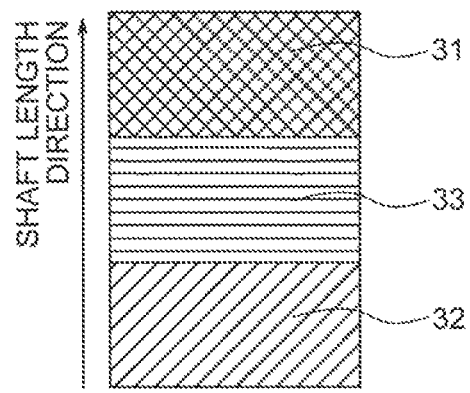
FIG. 19 is an explanatory view for illustrating a fourth example of the method of combining different tooth tip widths.
Figure 20:
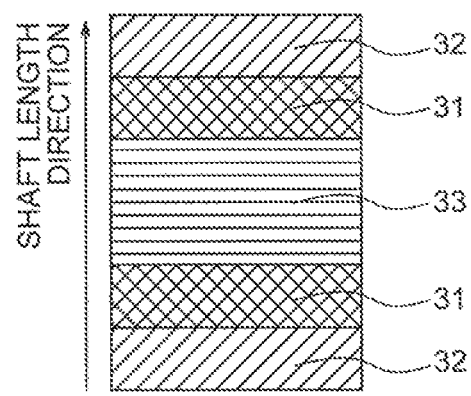
FIG. 20 is an explanatory view for illustrating a fifth example of the method of combining different tooth tip widths.

As the method of combining the portions, as illustrated in FIG. 19, a portion 31 of the tooth tip width ε1, a portion 32 of the tooth tip width ε2, and a portion 33 of the tooth tip width ε2 may be separated at two points in the shaft length direction. Moreover, as illustrated in FIG. 20, those portions may be combined by being separated at three or more points In other words, any ratio of shaft lengths at which the (S1/P)-th order component of the average value of the attraction force of the teeth 4 is minimized may be set when considered as the entire shaft length. For example, when K kinds of portions of different tooth tip widths are combined, any ratio may be set as long as Expression 2 below is minimized.

$$H = \sum_{j=1}^{K} L_j G_j \left( \cos \frac{S1}{P} \theta_j + \sin \frac{S1}{P} \theta_j \right)$$ Expression 2

In Expression 2, H represents an (S1/P)-th order component of an average value of the attraction force of all teeth 4. Moreover, $G_j$ represents an (S1/P)-th order component of the average value of the attraction force of all teeth 4 for the j-th tooth tip width of the K kinds of portions having the different tooth tip widths. Further, $L_j$ represents a stacking thickness of the j-th tooth top width of the K kinds of portions having the different tooth tip widths.

Figure 21:
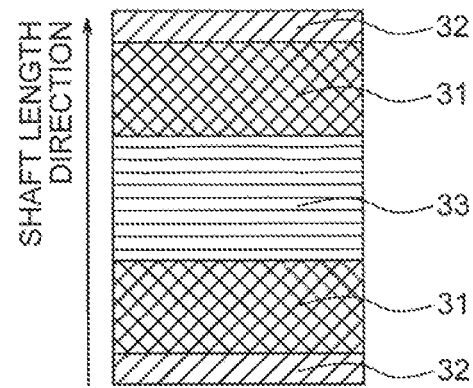
FIG. 21 is an explanatory view for illustrating a sixth example of the method of combining different tooth tip widths.

For example, in a case where values obtained by combining sine and cosine of the (S1/P)-th order components of the average values of the attraction force of the teeth having the tooth tip width ε1, the tooth tip width ε2, and the tooth tip width ε3 are minimized at magnitudes of 1.5:0.5:1, when the tooth tip width ε1, the tooth tip width ε2, and the tooth tip width ε3 are combined in the shaft length direction with a ratio of shaft lengths of 1.5:0.5:1 as illustrated in FIG. 21, the (S1/P)-th order component of the average value of the attraction force of the teeth 4 is reduced.

Figure 22:
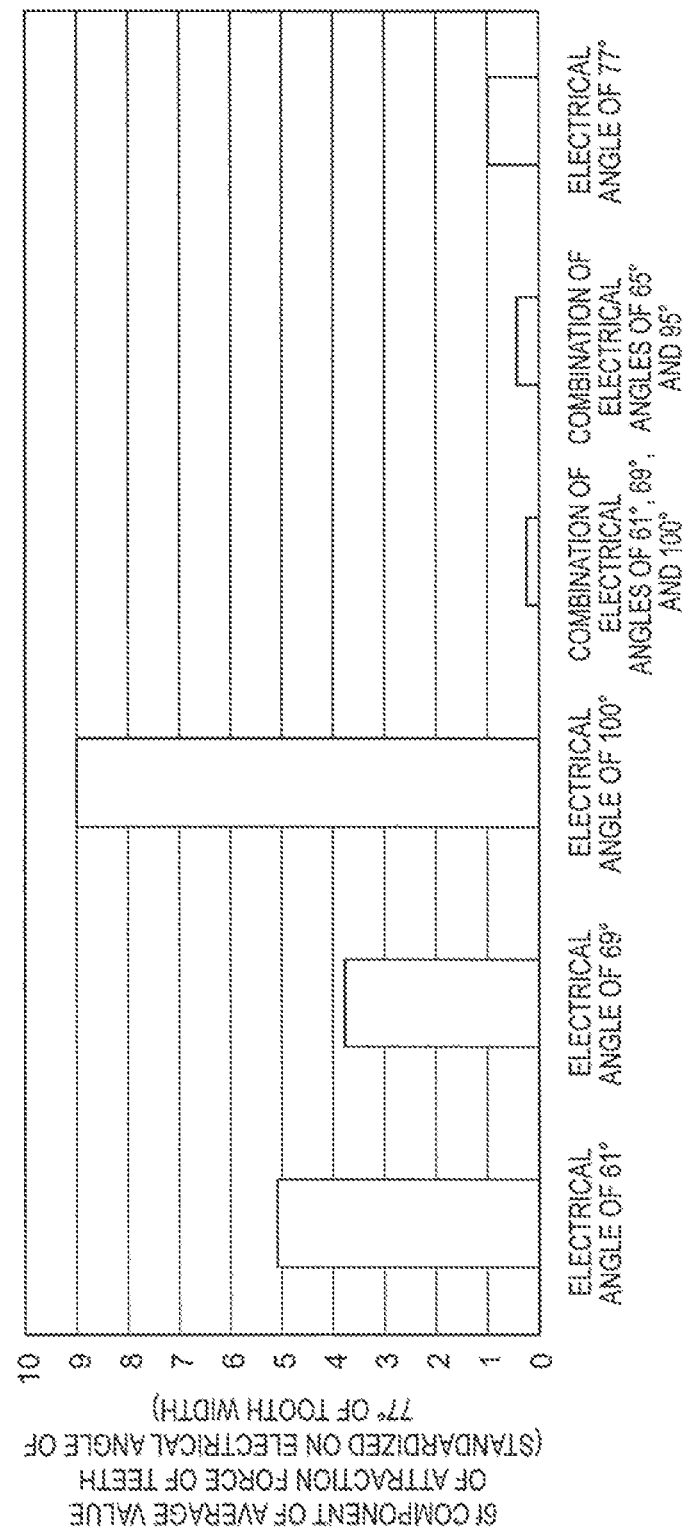
FIG. 22 is a second graph for showing differences among magnitudes of 6f components of average values of the attraction force of the teeth depending on differences in tooth tip width.

In FIG. 22, with the pole arc angle of each magnet being 128.1° in electrical angle, respective magnitudes of (S1/P)-th order components of average values of the attraction force of the teeth 4 for a case in which the tooth tip width is 61° in electrical angle, a case in which the tooth tip width is 69° in electrical angle, a case in which the tooth tip width is 100° in electrical angle, a case in which the tooth tip widths of 61°, 69°, and 95° in electrical angle are combined, a case in which the tooth tip widths of 65° and 95° in electrical angle are combined, and a case in which the tooth tip width is 77° in electrical angle are shown.

The vertical axis indicates the (S1/P)-th order components of the average values of the attraction force of the teeth 4 that are standardized on the value of 77° in electrical angle. For the case in which the electrical angle of 61°, the electrical angle of 69°, and the electrical angle of 100° are combined, a case in which a ratio of lengths of the teeth 4 in the axial direction of the stator 1 is 1.5:0.5:1 for the electrical angle 65°, the electrical angle 69°, and the electrical angle of 100°. For the case in which the electrical angle of 65° and the electrical angle of 95° are combined, a case in which the ratio of lengths of each tooth 4 in the axial direction of the stator 1 is set to 2:1 for the electrical angle of 65° and the electrical angle of 95°.

As shown in FIG. 22, the (S1/P)-th order component in the case where the electrical angle of 61°, the electrical angle of 69°, and the electrical angle of 100° are combined is reduced as compared to the case where the electrical angle of 65° and the electrical angle of 95° are combined.

From the above description, through combining the portions of the three kinds of tooth tip widths, the (S1/P)-th order components of the average values of the attraction force of the teeth 4 as a whole can be canceled by each other, and the noise of the motor can be reduced efficiently.

One kind of different tooth tip widths (γ2) may be a value that satisfies: β=−2.5α+319.7 [deg].

Moreover, in Embodiment 3, the portions of the three kinds of tooth tip widths are combined such that both sine and cosine of the attraction force of the teeth 4 are reduced. However, when portions of a larger number of kinds of tooth tip widths are combined, effects that are larger than those obtained when the three kinds of portions are combined can be obtained.

Further, when the stator 1 has a divided tooth structure of being divided for each tooth 4 in the circumferential direction, the tooth tip width can be set without being constrained by an arrangement, a shape, and the like of the windings, and the portions can be combined more effectively.

Embodiment 4

Next, Embodiment 4 of the present invention is described. The basic structure of a rotary electric machine according to Embodiment 4 is similar to that of FIG. 1. In Embodiment 4, the rotor 11 is skewed in a plurality of steps in the axial direction thereof. A skew angle of the rotor 11 is 72 degrees or more and 180 degrees or less in electrical angle when seen as the entire shaft length of the rotor 11.

Figure 23:
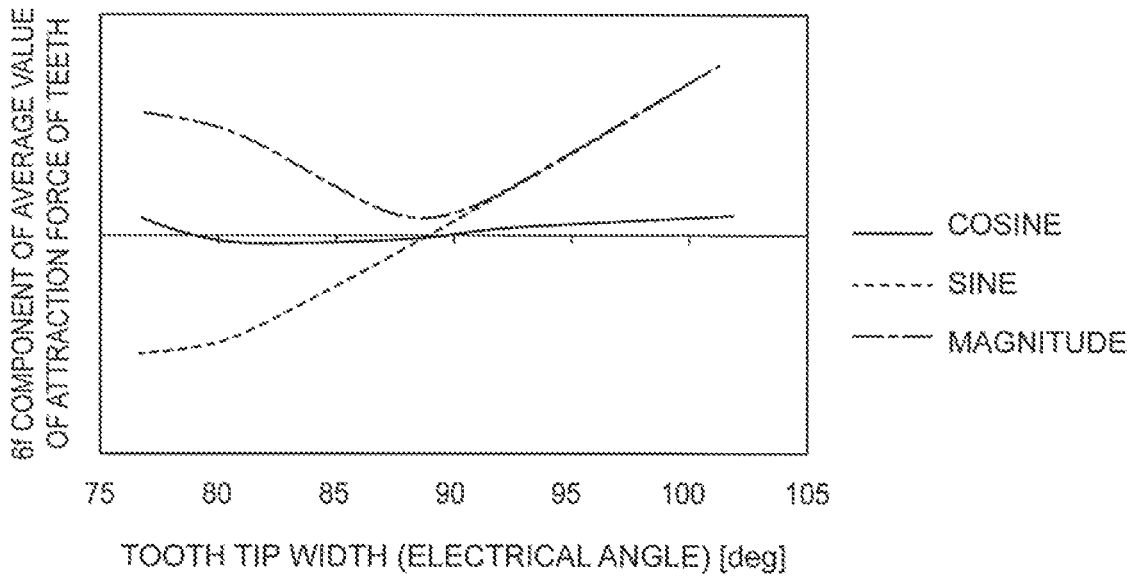
FIG. 23 is a graph for showing a relationship between a tooth tip width and a 6f component of an average value of attraction force of teeth when a rotor of a rotary electric machine according to Embodiment 4 of the present invention is skewed.

FIG. 23 is a graph for showing, in a case where a pole arc angle β of each permanent magnet 13 of the rotary electric machine according to Embodiment 4 is 128.1°, a relationship between the 6f component of the average value of the attraction force of the teeth 4 when the rotor 11 is skewed such that the 6f component of the average value of the attraction force of the teeth 4 is minimized, and the tooth tip width.

From FIG. 23, a value of cosine of the 6f component of the average value of the attraction force of the teeth 4 is substantially reduced to 0. Meanwhile, a value of sine has a minimum value with respect to the tooth tip width, and a minimum value of the amplitude is located at around the tooth tip width of 88°.

Figure 24:
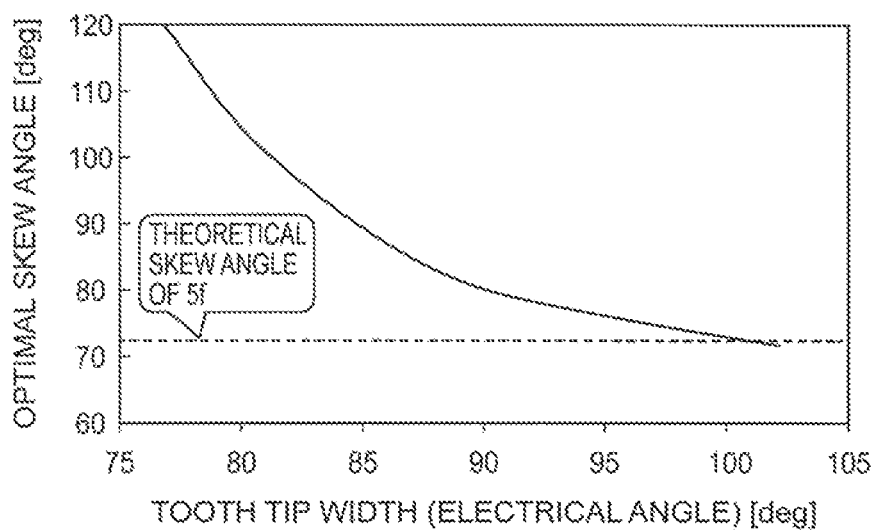
FIG. 24 is a graph for showing a relationship between the tooth tip width and an optimal skew angle at which the 6f component of the average value of the attraction force of the teeth is minimized when a pole arc angle of each permanent magnet is 128.1° in Embodiment 4.

Moreover, a relationship between an optimal skew angle and the tooth tip width in FIG. 23 is shown in FIG. 24. As shown in FIG. 24, as the tooth tip width becomes larger, the optimal skew angle is tangent to 72 degrees, which is a theoretical skew angle of 5f , and it can be seen that as the tooth tip width becomes smaller, the optimal skew angle becomes larger.

Figure 25:
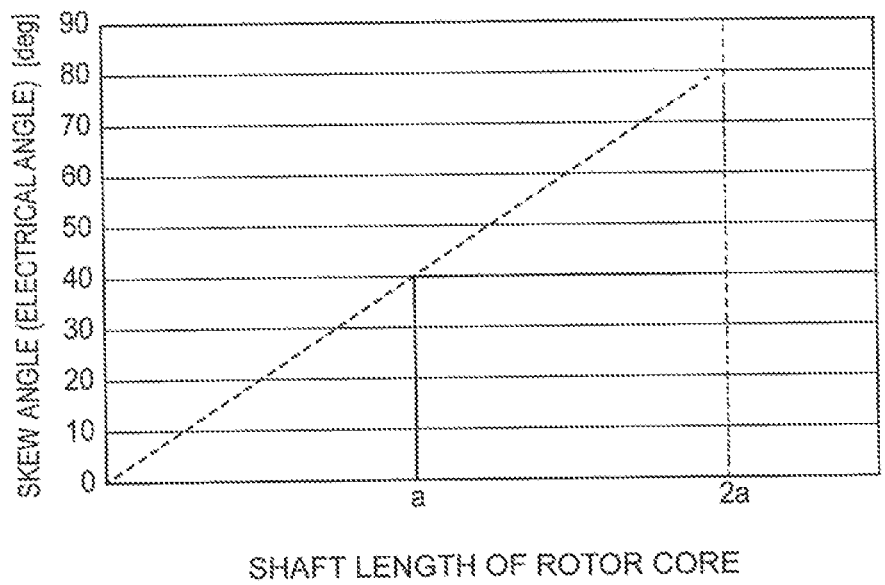
FIG. 25 is a graph for showing a relationship between a shaft length of a rotor core and a skew angle in Embodiment 4.

Definition of the skew angle is described with reference to FIG. 25. The skew angle as described in Embodiment 4 is an angle over the entire shaft length direction that is expressed in electrical angle. For example, in two-step skew shown in FIG. 25, when a shaft length of the rotor core 12 is represented by 2a, and in a case where the skew angle is set to 0° in a range of from 0 to a, and the skew angle is set to 40° in a range of from a to 2a (straight line in FIG. 28) , the skew angle is a skew angle per shaft length of 2a (this time, 80 degrees in electrical angle) as indicated by the broken line. The case of two-step skew is described this time, but an equivalent value is obtained also when the number of skew steps is three or more.

Figure 26:
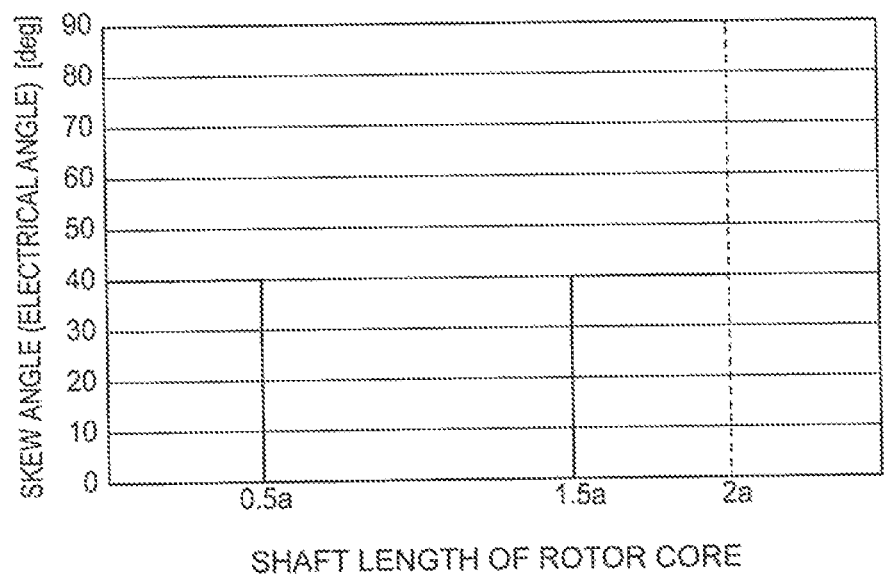
FIG. 26 is a graph for showing a modification example of a relationship between the shaft length of the rotor core and the skew angle in Embodiment 4.

Moreover, as a method of skewing, the skew angle may not be uniformly increased as shown in FIG. 26. In the case of FIG. 26, a shaft length for the skew angle of 0° is a, and a shaft length for the skew angle of 40° is also a. Therefore, when a small skew angle and a large skew angle are combined, the entirety is the same as that of FIG. 24, and the skew angle is expressed as 80 degrees in electrical angle.

Figure 27:
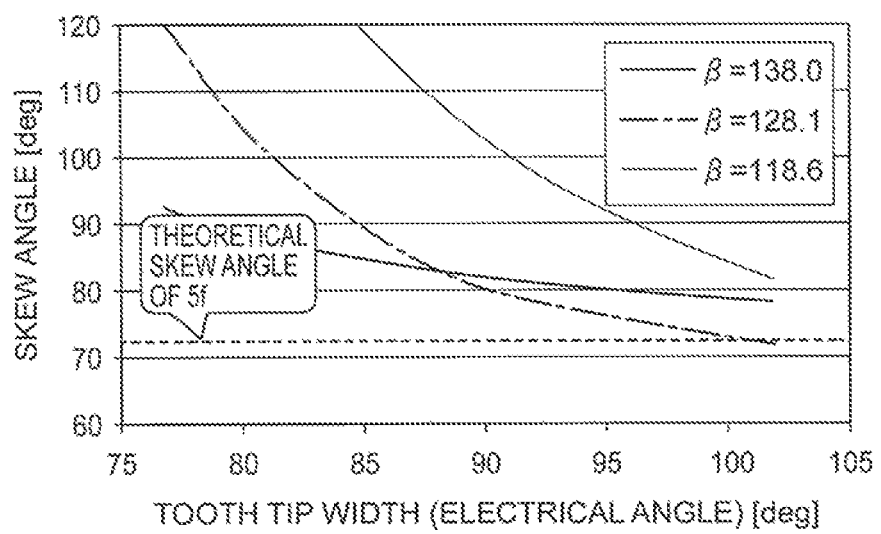
FIG. 27 is a graph for showing a relationship between the tooth tip width and an optimal skew angle at which the 6f component of the average value of the attraction force of the teeth is minimized when the pole arc angle of each permanent magnet is changed.

In FIG. 27, optimal skew angles for cases in which the pole arc angle of each permanent magnet 13 is changed are shown. As in FIG. 25, it can be seen that, even when the pole arc angle is changed, the optimal skew angle is 72 degrees or more.

In Embodiment 4, one kind of tooth tip width has been considered, but even in a case where a plurality of tooth tip widths are combined as described in Embodiments 2 and 3, when the optimal skew angle is set to 72 degrees or more, 6f of the average value of the attraction force of the teeth 4 can be reduced.

Figure 28:
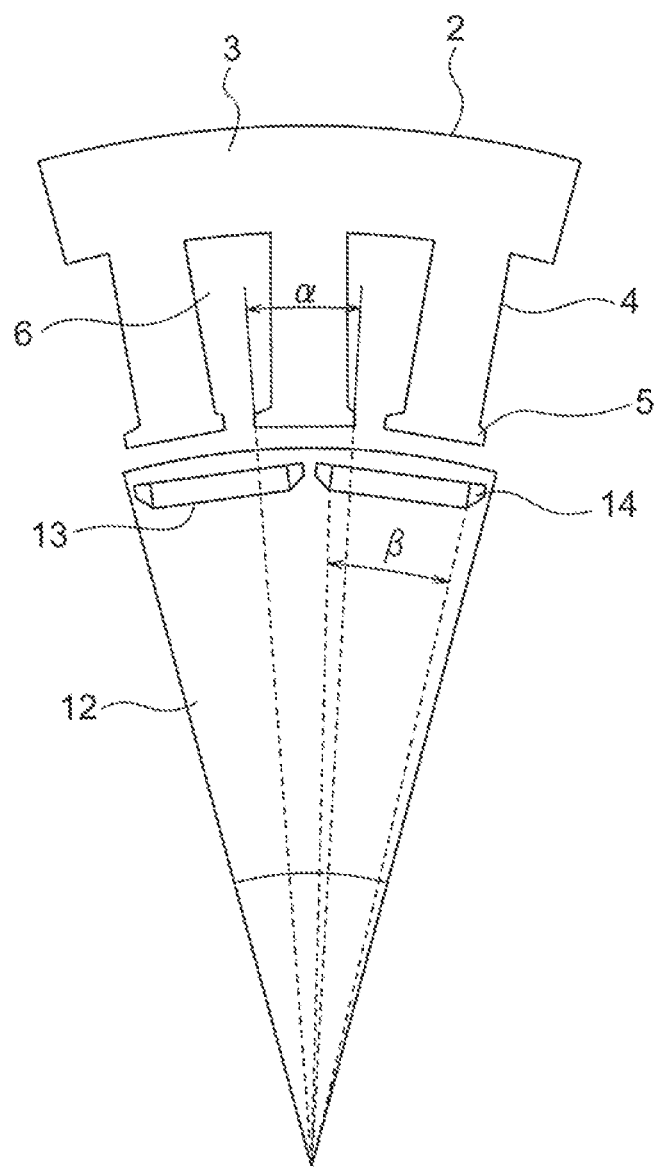
FIG. 28 is a cross-sectional view for illustrating a modification example in which a tooth flange is horizontally asymmetrical.

Moreover, in Embodiments 1 to 4, the case in which the tooth flange 5 is provided horizontally symmetrically with respect to one tooth 4 has been described. However, the tooth flange 5 may be asymmetric with respect to a center line in the width direction of the tooth 4 as illustrated in FIG. 28, for example, and similar effects can be obtained also in this case.

Figure 29:
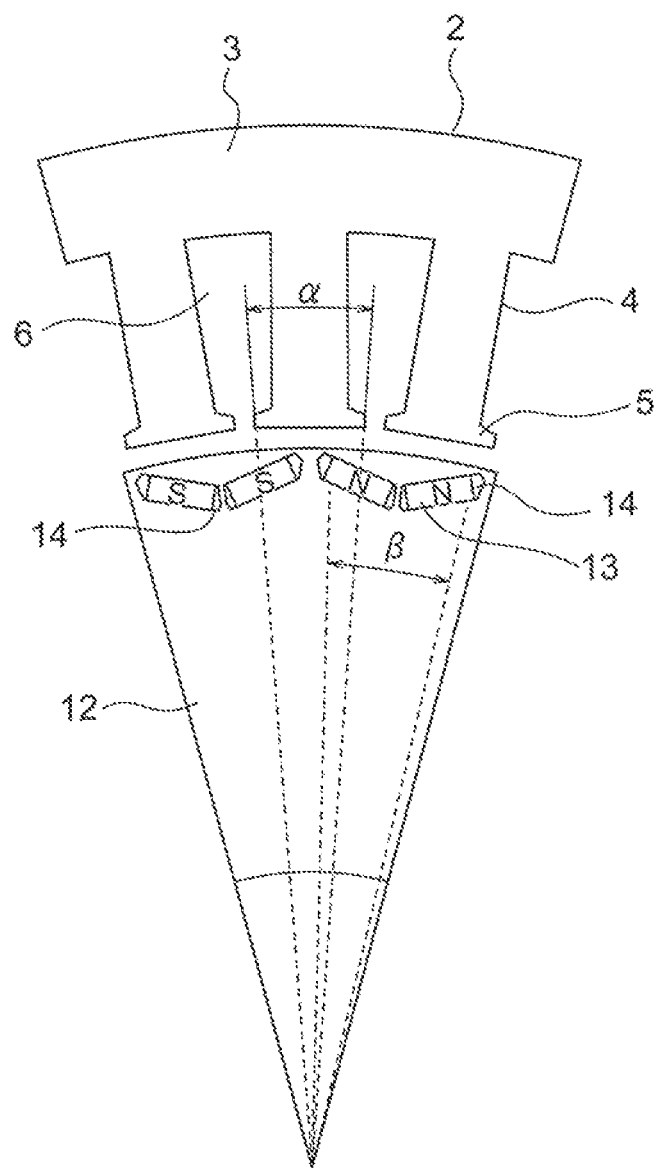
FIG. 29 is a cross-sectional view for illustrating a modification example in which two permanent magnets are arranged for each pole.

Further, in Embodiments 1 to 4, the case in which one permanent magnet 13 is provided for each pole has been described. However, two permanent magnets 13 may be provided in a V shape for each pole as illustrated in FIG. 29, for example, and similar effects can be obtained also in this case. A pole arc angle β of the magnets in this case is, as illustrated in FIG. 29, a value obtained by multiplying an angle in the direction of rotation between two straight lines that connect both ends on a radially outer side of the rotor to the rotation center by the number of pole pairs (12).

REFERENCE SIGNS LIST 1 stator, 2 stator core, 3 core back, 4 tooth, 6 slot, 11 rotor, 12 rotor core, 13 permanent magnet

The invention claimed is:

1. A rotary electric machine, comprising:
a stator including a stator core; and
a rotor including a rotor core and a plurality of permanent magnets, which are fixed to the rotor core, the rotor being rotatable with respect to the stator,
the stator core including an annular core back, and a plurality of teeth, which project radially inward from the annular core back,
the stator core having slots formed between the plurality of teeth,
the rotary electric machine having a ratio of a number of poles to a number of slots of 2:3,
wherein, where an electrical angle of a tooth tip width, which is a width dimension of a tip of each of the plurality of teeth in a circumferential direction of the stator, is α, an electrical angle of a pole arc angle, which is an angle formed by two straight lines that connect a rotation center of the rotor to corners on a rotor surface side of one of the plurality of permanent magnets, is β, and a number of pole pairs is P,
α is within a range of ±0.2°×P, and β satisfies the following expression:

$$\beta = -2.5\alpha + 319.7.$$

2. A rotary electric machine, comprising:
a stator including a stator core; and
a rotor including a rotor core and a plurality of permanent magnets, which are fixed to the rotor core, the rotor being rotatable with respect to the stator,
the stator core including an annular core back, and a plurality of teeth, which project radially inward from the annular core back,
the stator core having slots formed between the plurality of teeth,
the rotary electric machine having a ratio of a number of poles to a number of slots of 2:3,
wherein, where an electrical angle of a tooth tip width, which is a width dimension of a tip of each of the plurality of teeth in a circumferential direction of the stator, is α, an electrical angle of a pole arc angle, which is an angle formed by two straight lines that connect a rotation center of the rotor to corners on a rotor surface side of one of the plurality of permanent magnets, is β, α and β satisfy the following expression: β=−2.5α+319.7, and
wherein each of the plurality of teeth is formed by combining, in an axial direction of the stator, a portion having a tooth tip width of γ1, which is smaller than α, and a portion having a tooth tip width of γ2, which is larger than α.

3. The rotary electric machine according to claim 2, wherein, where an average value of radial attraction force generated by all of the plurality of teeth is F1, a smallest common multiple of the number of poles and the number of slots is S1, a number of pole pairs is P, and
where a minimum absolute cosine value and a minimum absolute sine value of an (S1/P)-th order of a radial attraction force for each of tooth tip widths γ1 and γ2 are δ1 and δ2, respectively, an electrical angle of δ1 and δ2 that is smaller than β is Amin, and an electrical angle of δ1 and δ2 that is larger than β is Amax, the following expressions are satisfied:

$$\gamma 1 < \text{Amin; and Amax} < \gamma 2.$$

4. The rotary electric machine according to claim 3, wherein, where magnitudes of change amounts of δ1 and δ2 that is larger in change amount when the tooth tip width is varied are Fδ1 and −Fδ2,
the portion of γ1 and the portion of γ2 are stacked so that thicknesses of the portion of γ1 and the portion of γ2 in a shaft length direction have a ratio of |Fγ2|:|Fγ1|.

5. A rotary electric machine, comprising:
a stator including a stator core; and
a rotor including a rotor core, and a plurality of permanent magnets, which are fixed to the rotor core, the rotor being rotatable with respect to the stator,
the stator core including an annular core back, and a plurality of teeth, which project radially inward from the annular core back,
the stator core having slots formed between the plurality of teeth,
the rotary electric machine having a ratio of a number of poles to a number of slots of 2:3,
wherein, where an electrical angle of a tooth tip width, which is a width dimension of a tip of each of the plurality of teeth in a circumferential direction of the stator, is α, an electrical angle of a pole arc angle, which is an angle formed by two straight lines that connect a rotation center of the rotor to corners on a rotor surface side of one of the plurality of permanent magnets, is β, and α and β satisfy the following expression:

β=−2.5α+319.7 wherein each of the plurality of teeth is formed by combining, in an axial direction of the stator, portions having a plurality of tooth tip widths, and
wherein a smallest width of the portions in electrical angle is smaller than α, and a largest width of the portions in electrical angle is larger than α.

6. The rotary electric machine according to claim 5, wherein, where an average value of radial attraction force generated by all of the plurality of teeth is F1, a smallest common multiple of the number of poles and the number of slots is S1, a number of pole pairs is P, and
where a minimum absolute cosine value and a minimum absolute sine value of an (S1/P)-th order of a radial attraction force for each of tooth tip widths γ1 and γ2 are δ1 and δ2, respectively, an electrical angle of δ1 and δ2 that is smaller than β is Amin, and δ1 and δ2 that is larger than β Amax, an electrical angle of at least one of the plurality of tooth tip widths is smaller than Amin, and a maximum value of an electrical angle of at least one of the plurality of tooth tip widths is larger than Amax.

7. The rotary electric machine according to claim 6, wherein, where respective thicknesses in a shaft length direction of the plurality of tooth tip widths are by L1, L2, . . . , and LK, magnitudes of the varying components of the (S1/P)-th order of the radial attraction force are by G1, G2, . . . , and GK, phases are by θ1, θ2, . . . , and θK, and a thickness in the shaft length direction and cosine and sine of varying components of the (S1/P)-th order of the radial attraction force is H,
the plurality of tooth tip widths are combined in the shaft length direction so that H is minimized.

8. The rotary electric machine according to claim 1, wherein the rotor is skewed in a plurality of steps in an axial direction thereof, and a skew angle of the rotor is an electrical angle of 72 degrees or more and 180 degrees or less based on an entire shaft length of the rotor.

9. The rotary electric machine according to claim 2, wherein the rotor is skewed in a plurality of steps in an axial direction thereof, and a skew angle of the rotor is an electrical angle of 72 degrees or more and 180 degrees or less based on an entire shaft length of the rotor.

10. The rotary electric machine according to claim 5, wherein the rotor is skewed in a plurality of steps in an axial direction thereof, and a skew angle of the rotor is an electrical angle of 72 degrees or more and 180 degrees or less based on an entire shaft length of the rotor.

* * * * *